Jan. 23, 1940.    J. A. GUTHRIE    2,188,081
ORNAMENTAL TREE
Filed Feb. 24, 1939    2 Sheets-Sheet 1
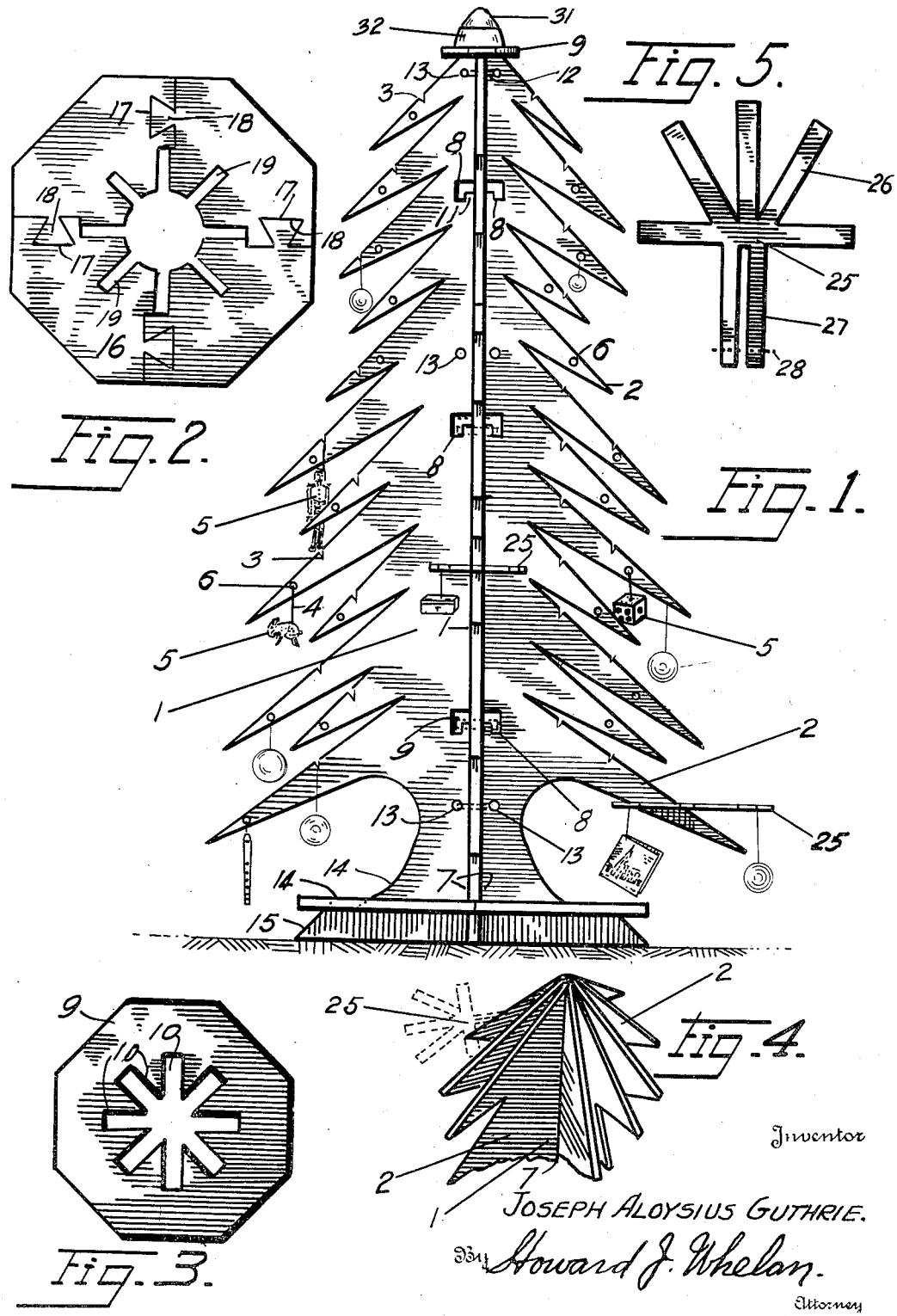
Inventor
JOSEPH ALOYSIUS GUTHRIE.
By Howard J. Whelan.
Attorney Jan. 23, 1940.    J. A. GUTHRIE    2,188,081
ORNAMENTAL TREE
Filed Feb. 24, 1939    2 Sheets-Sheet 2
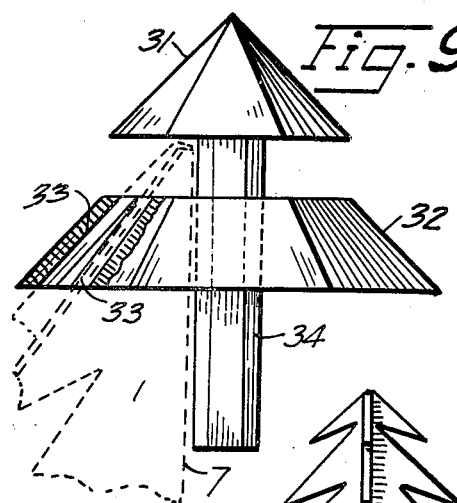
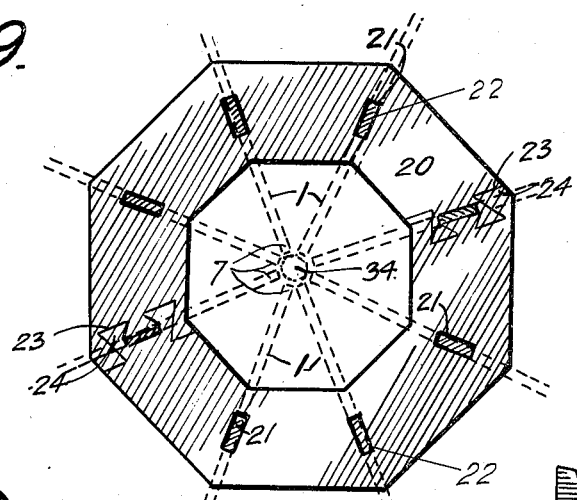
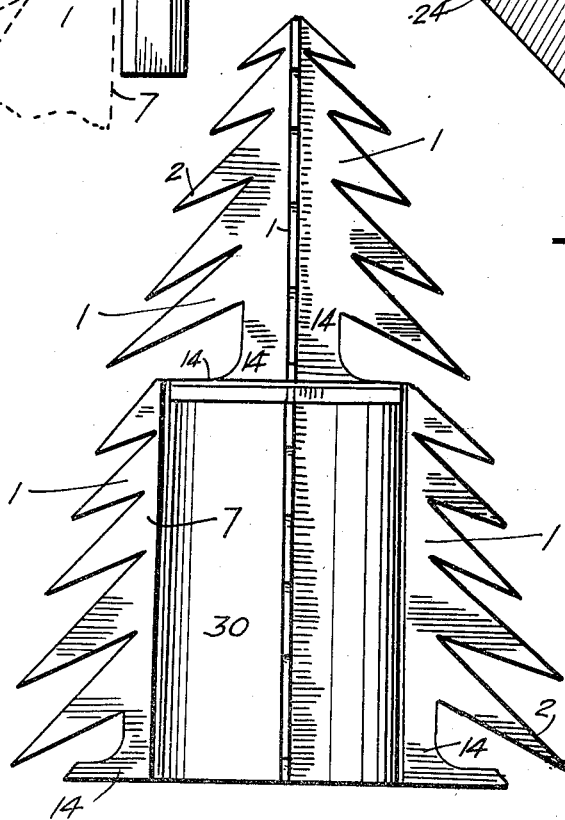
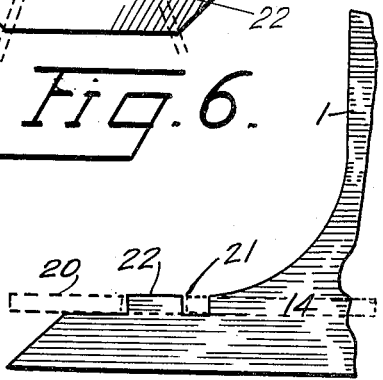
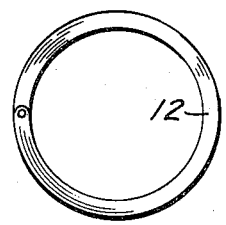
Inventor
JOSEPH ALOYSIUS GUTHRIE.
Howard J. Whelan.
Attorney Patented Jan. 23, 1940

2,188,081

UNITED STATES PATENT OFFICE 2,188,081

ORNAMENTAL TREE

Joseph Aloysius Guthrie, Baltimore, Md.

Application February 24, 1939, Serial No. 258,124

6 Claims. (Cl. 41—15)

This invention refers to ornamental trees and more particularly to trees suitable for use at Christmas and occasions of a like nature where the tree affords a support for presents and artistic articles. It has, among its objects, to provide a tree of this nature that may be constructed of any flat material and especially of wood, presswood, plywood and fibre kinds. To have such wood, etc. formed or cut to any standard designs that will permit the article to be manufactured on production methods. Another object is to have the tree designed for facile and unit assembly and for flexible unit addition or substraction of the branch members of which it is made. A further object is to design the tree so that it may be folded up compactly when it is desired to remove same from use, and in such a condition as to be strong and substantial enough to withstand damage or injury. A still further object is to provide a base that will look attractive and at the same time improve the stability of the device and hold its branches substantially in their proper positions. It also has an object to provide attachment that will extend the tree made up into an unlimited number of varied forms, sizes, and appearances, to anticipate particular shapes and designs of tree life that the owner may wish to copy.

Other objects will become apparent as the invention is more fully set forth.

In the drawings, which illustrate a form of this invention:

Figure 1 is a side elevation of a tree embodying this invention,

Figure 2 is a plan view of the patchwork base plate, utilized for the tree shown in Figure 1, for holding the branch members in proper position, Figure 3 is a detail of the locking plate used for holding the branch members in place at different parts of the tree, Figure 4 is a detail in perspective to show the manner in which the upper end portions of the tree are formed with the assembled branch members, and made ready to receive the cap, Figure 5 is a detail of the auxiliary hands used on the branch members to increase the foliage effect and provide accessory construction to the tree, Figure 6 is a detail of a modified form of foundation element used to give stability to the tree, Figure 7 is an enlarged detail showing the manner in which the base leg of the tree fits with the foundation element indicated in Figure 6, Figure 8 is a detail of the hinge or link device used to link the branch members together and permit them to be closed like a book on each other, Figure 9 is a detail of the slightly modified form of cap piece used on the tree to make the top portion complete in appearance and to more substantially connect the ends, Figure 10 is a modified form of assembly in diagrammatic outline, to indicate the general method of building up the tree in tiers and on the unit system.

Similar reference characters refer to similar parts throughout the drawings.

The use of natural trees for Christmas and like purposes involves a considerable economic waste, which has been seriously considered heretofore. In this invention, the use of flat material enables the tree to be cut out and built very readily. It may be stamped or cut out in quantities for production purposes, and readily assembled and in doing so, lock itself together. It also has the feature of being of unit growth sufficient to permit it to be increased in number of branch and leave members and in the heighth, so as to keep any desirable proportions and obtain any fullness of outline that may meet the requirements of the conditions arising. By reason of the use of flat material, it may be of remarkable lightness as well as stiffness, and can be decorated on the flat sides to suit an unlimited variety of situations. It may be knocked-down with facility and folded into a compact flat book-like form, and stored away for future uses, and kept in good condition. The use of plywood for the construction gives a life of many years of usefullness, and the cost is moderate, matters in which the natural trees used for the same purpose cannot compare.

In the drawings, 1 represents a branch member of the tree embodying this invention. There are preferably four or multiples of four, sets of branch members to make a tree, and in the drawings eight sets have been utilized. The branch member is cut into a series of so-called leaves 2 of fancied form and shape to give the member the general appearance of a tree. These leaves may be straight or hooked as at 3, the latter being provided for aesthetic reasons, and for the practical purposes of attaching strings or wires 4 from articles 5. The holes 6 are also provided for the same purpose and are arranged to suit the articles to be supported.

The central edge portion 7 of the member is preferably straight so as to be perpendicular when used in the tree. The central portion is also provided with L-shaped slots 8 at the top, middle, and near the bottom, and arranged to take a locking plate 9. The locking plate is provided with radial slots 10 which the projections 11 in the branch members fit.

This locking plate is made in the form in which the branch members are set, which in this case is octagon. The locking plate, thus not only holds the branch members together, but also keeps them in their proper upright open position.

Links 12, of the detachable type, are also mounted in holes 13 in the members, to hold the latter together and yet permit the same to be swung around as on hinges. The base leg 14 of the branch member is extended outwardly to provide a foundation for the same. The end portions 15 are preferably bevelled off as indicated.

The members are, in this case, made from flat sheet material of reasonable stiffness and lightness. The base legs 14 are held in position by a foundation plate element 16 which is preferably divided into four symmetrical parts as indicated and dovetailed at 17 and 18 to fit and lock into each other, and yet permit easy detachment from each other.

The Figure 6 shows a different form of foundation plate to that indicated in Figure 2. In the latter, the sections are separated and pushed towards the axis of the tree, when assembled thereon.

They move horizontally in general, by their openings in their slots 19 and when all are assembled together, form a locked foundation for the tree.

In the modified form the foundation plate 20 may be made in two sections and the slots 21 therein fit over projections 22 in the branch members as indicated in Figure 2, their dovetailed portions 23, 24 serving to lock into each other securely as indicated, as well as hold the branch members in a substantial assembly. The hand sprays 25 consist of a series of spreading fingers 26, shaped to form the special outline of certain pine trees and the like, and are attached in units, by the slotted portion 27 designed to fit on the leaves 2 in straddle form, besides resting on same as shown in Figure 1.

They are preferably secured with a pin 28 or frictional jaws of some appropriate nature, in place.

In the tier construction, where the size of the tree is augmented in heighth, the top tree is made in the conventional manner described; then open cylinders 30, suitably notched to take the links or locking plates are utilized to hold them in place. The cylinder is preferably rounded to permit large numbers of branch members to be attached and increased over that of the top tree unit, in order that the branches will be filled in to take care of the increasing greater area of the base periphery, which the pyramidical form of the tree creates. Other cylinders of progressive size may be added underneath until the heighth and size of the tree suits the desires of the user.

The top cap 31, 32 is similar to that shown on the tree in Figure 1, and is in two parts to make it easier to manipulate. Slots 33, are arranged in the lower part 32 to take the flat upper end portions of the branch members and fit same tightly and securely. The top part 31 has a stem 34 which is pushed and fits into the space between the straight edges of the branch members, and being of the polygonal form to suit the arrangement of these members, acts as a brace wedge to keep them positioned properly. The parts 31, 32 fit on each other to make a complete unit and finish off the top of the tree. The stem of the bottom part affords a method for strengthening the top and keep it from loosening. In other respects, the tree thus built up with the branch units is similar to the basic tree formed from them.

In opening and using the device, the operator opens the branch members 1, held together by the links 12 and swings them into radial positions to form a tree outline. In these positions, which in this case, is eight-pointed, one of the locking members or cap is placed at the top of the tree to lock the branch members in position. To reinforce the locking action additional locking members are placed in the L-shaped slots 8 at other parts of the tree. The articles are then strung into position, and any coloring desirable, placed on the parts of the tree.

The tree branch members may be used as units and be built up in tiers to form trees above each other as shown in the drawings. The cylinders provided for each tier of tree branch members are arranged to take the members in the same manner as the adjacent tree branch members do with the use of hinge members of the type suitable for the purpose. This manner of building up is unlimited for ordinary purposes, and simply requires the use of base cylinders to keep the general outline of the type of tree copied. Also, the addition of the accessory hand units used for increasing the fullness of the branch members may be used to the extent desirable. Many variations may be produced without affecting the appearance of the tree to an extent that will spoil its intended use, but on the other hand, accentuate the effect and its attractiveness for the use described.

While but one form of the invention is shown in the drawings, it is not desired to limit this application for patent to the particular construction shown in the drawings, otherwise than limited by the prior art, as it is appreciated, that other forms could be made, using the same principles and coming within the scope of the appended claims.

Having thus described the invention, what is claimed is:

1. An artificial tree of the class described, comprising in combination, a series of branch members having leaves formed thereon and openings therein, means for hinging the branch members together and permitting their folding or closing on each other, and means in the openings for locking the members rigidly together, and foundation members adapted to surround the said branch members and lock the same together and support the tree.

2. An artificial tree of the class described, comprising in combination, a series of branch members having leaves formed thereon and openings therein, means for hinging the branch members together and permitting their folding or closing on each other, and means in the openings for locking the members rigidly together, and foundation plates adapted to fit on the leg portions of the branch members and into each other in dovetailed manner, for locking the said members into predetermined positions, and stabilizing the tree.

3. An artificial tree of the class described, comprising in combination, a plurality of flat branch members simulating tree contours on one longitudinal edge and straight on the other, with L-shaped slots formed adjacent the edge, the straight edges being disposed and aligned with but spaced apart from each other to position the members radially about the central axis of the tree, locking plates for the slots for securing the members in their predetermined positions, a patchwork foundation plate for the insertion of the bottom portions of the branches and their rigid attachment thereto, links for hinging the members together independently of the said plates, for holding the members together when the plates are detached therefrom, and to permit them to be folded flat on each other for storing purposes, and auxiliary hands attachable and mountable on the said contoured edges for increasing the foliage effect of the said branch members.

4. An artificial tree of the class described, comprising in combination, a plurality of branch members simulating tree contours on one longitudinal edge and straight on the other, slots formed adjacent the edge, the straight edges being disposed and aligned with, but spaced apart from each other to position the members radially about the central axis of the tree, locking plates for the slots for securing the members in their predetermined positons, a patchwork foundation plate for the insertion of the bottom portions of the branches and their rigid attachment thereto, links for hinging the members together independently of the said plates for holding the members together when the plates are detached therefrom, and to permit them to be folded flat on each other for storing purposes.

5. An artificial tree of the class described, comprising in combination, a flat foundation plate made up in a series of dovetailed and interlocked plates having narrow rectangular slots therein disposed in radial arrangement about the central portion of the plate but spaced away from the axis portion thereof, a plurality of branch members of flat material cut straight on one longitudinal edge and diminishing in width from top to bottom with the other edge of irregular form, the bottom portions of the members being extended sufficiently to fit in the said slots and under the foundation plate so as to support same and be locked in predetermined arrangement thereby, a top cap for the apex of the tree formed to take the upper portions of the branch members in predetermined arrangement coinciding with that of the foundation plate, means for locking and hinging the branches together at various locations adjacent the straight edges to additionally secure and increase the rigidity of the same and without bringing the members into the central axis space of the tree, and means for increasing the external foliage contour of the branch members, said means being bifurcated to straddle the members individually and hold themselves thereon.

6. An artificial tree of the class described, comprising in combination, a flat foundation plate made up in a series of interlocked plates having narrow slots therein disposed in radial arrangement about the central portion of the plate, a plurality of branch members of flat material cut straight on one longitudinal edge and diminishing in width from top to bottom with the other edge of irregular form, the bottom portions of the members being extended sufficiently to fit in the said slots and under the foundation plate so as to support same in predetermined arrangement, a top cap for the apex of the tree formed to take the upper portions of the branch members in predetermined arrangement coinciding with that of the foundation plate, means for locking the branches together at various locations adjacent the straight edges to additionally secure and increase the rigidity of the same, and without bringing the members into the central axis space of the tree.

JOSEPH ALOYSIUS GUTHRIE.